(12) United States Patent
Bordes et al.

(10) Patent No.: US 12,231,619 B2
(45) Date of Patent: Feb. 18, 2025

(54) PREDICTION FOR VIDEO ENCODING AND DECODING USING EXTERNAL REFERENCE

(71) Applicant: INTERDIGITAL CE PATENT HOLDINGS, SAS, Paris (FR)

(72) Inventors: Philippe Bordes, Laille (FR); Didier Doyen, Cesson-Sévigné (FR); Franck Galpin, Thorigne-Fouillard (FR); Michel Kerdranvat, Chantepie (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 191 days.

(21) Appl. No.: 17/762,922

(22) PCT Filed: Sep. 18, 2020

(86) PCT No.: PCT/EP2020/076193
§ 371 (c)(1),
(2) Date: Mar. 23, 2022

(87) PCT Pub. No.: WO2021/058401
PCT Pub. Date: Apr. 1, 2021

(65) Prior Publication Data
US 2022/0360771 A1    Nov. 10, 2022

(30) Foreign Application Priority Data

Sep. 23, 2019 (EP) .................................. 19306164

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/172* (2014.11); *H04N 19/597* (2014.11)

(58) Field of Classification Search
CPC .. H04N 19/105; H04N 19/139; H04N 19/172; H04N 19/597; H04N 19/70; H04N 19/58
See application file for complete search history.

(56) References Cited

U.S. PATENT DOCUMENTS

2011/0274174 A1* 11/2011 Francois ................ H04N 19/46
375/E7.125
2013/0223525 A1* 8/2013 Zhou .................... H04N 19/105
375/E7.243
(Continued)

FOREIGN PATENT DOCUMENTS

EP      3264767 A1    1/2018

OTHER PUBLICATIONS

Tourapis et al., "Weighted prediction methods for improved motion compensation", Institute of Electrical and Electronics Engineers (IEEE), 2009 16th IEEE International Conference on Image Processing (ICIP), Cairo, Egypt, Nov. 7, 2009, 5 pages.

(Continued)

*Primary Examiner* — Farzana Hossain
(74) *Attorney, Agent, or Firm* — Condo Roccia Koptiw LLP

(57) ABSTRACT

Various embodiments relate to a video coding system in which some elements required for decoding are generated according to a process that not specified within the video coding system. This process is hereafter referenced to as being the "external" process. This external process may generate "external" reference pictures to be used by a decoder that is adapted to use these external pictures. Encoding method, decoding method, encoding apparatus, decoding apparatus based on this post-processing method are proposed.

12 Claims, 9 Drawing Sheets

(51) Int. Cl.
H04N 19/172 (2014.01)
H04N 19/597 (2014.01)

(56) References Cited

U.S. PATENT DOCUMENTS

| | | | |
|---|---|---|---|
| 2014/0003799 | A1 | 1/2014 | Soroushian et al. |
| 2014/0036033 | A1* | 2/2014 | Takahashi ............ H04N 19/597 348/43 |
| 2018/0124408 | A1* | 5/2018 | Choi ...................... H04N 19/82 |
| 2019/0215522 | A1* | 7/2019 | Zhang .................. H04N 19/159 |
| 2022/0038733 | A1* | 2/2022 | Hannuksela ........... H04N 19/30 |

OTHER PUBLICATIONS

Boyce et al, "Draft High Efficiency Video Coding (HEVC) Version 2, Combined Format Range Extensions (RExt), Scalability (SHVC), and Multi-View (MV-HEVC) Extensions", Joint Collaborative Team on Video Coding (JCT-VC) of ITU-T SG 16 WP 3 and ISO/IEC JTC 1/SC 29/WG 11, Document: JCTVC-R1013_v6, 18th Meeting: Sapporo, Japan, Jun. 30, 2014, 535 pages.

Zuo et al., "Library Based Coding for Videos with Repeated Scenes", Institute of Electrical and Electronics Engineers (IEEE), 2015 Picture Coding Symposium (PCS), Cairns, QLD, Australia, May 31, 2015, 5 pages.

Bross et al., "Versatile Video Coding (Draft 6)", Joint Video Experts Team (JVET) of ITU-T SG 16 WP 3 and ISO/IEC JTC 1/SC 29/WG 11, Document: JVET-O2001-vE, 15th Meeting, Gothenburg, Sweden, Jul. 3, 2019, 455 pages.

Chen et al., "Algorithm description for Versatile Video Coding and Test Model 6 (VTM 6)", Joint Video Experts Team (JVET) of ITU-T SG 16 WP 3 and ISO/IEC JTC 1/SC 29/WG 11, Document: JVET-O2002-v2, 15th Meeting: Gothenburg, Sweden, Jul. 3, 2019, 87 pages.

Seregin et al., "AHG17: On zero delta POC in reference picture structure", Joint Video Experts Team (JVET) of ITU-T SG 16 WP 3 and ISO/IEC JTC 1/SC 29/WG 11, Document: JVET-O0244-v1, 15th Meeting: Gothenburg, Sweden, Jul. 3, 2019, 3 pages.

Vasconcelos et al., "Library-based coding: a representation for efficient video compression and retrieval", Institute of Electrical and Electronics Engineers (IEEE), Proceedings DCC '97, Data Compression Conference, Snowbird, Utah, USA, Mar. 25, 1997, 10 pages.

Anonymous, "High Efficiency Video Coding", ITU-T Telecommunication Standardization Section of ITU, Series H: Audiovisual and Multimedia Systems, Infrastructure of audiovisual services—Coding of moving video, Recommendation ITU-T H.265, Dec. 2016, 664 pages.

Anonymous, "Series H: Audiovisual and Multimedia Systems, Infrastructure of audiovisual services—Coding of moving video—Information Technology—Generic coding of moving pictures and associated audio information: Video", International Telecommunication Union, ITU-T Telecommunication Standardization Sector of ITU, Recommendation ITU-T H.262, Feb. 2000, 220 pages.

Zhao et al., "Enhanced Motion-Compensated Video Coding with Deep Virtual Reference Frame Generation", Institute of Electrical and Electronics Engineers (IEEE), IEEE Transactions on Image Processing, vol. 28, No. 10, Oct. 2019, 13 pages.

Anonymous, "Information technology—Generic coding of moving pictures and associated audio information: Systems", International Telecommunication Union, ITU-T Telecommunication Standardization Sector of ITU, Series H: Audiovisual and Multimedia Systems—Infrastructure of audiovisual services—Transmission multiplexing and synchronization, Recommendation ITU-T H.222.0, Jun. 2012, 228 pages.

* cited by examiner

PREDICTION FOR VIDEO ENCODING AND DECODING USING EXTERNAL REFERENCE

CROSS REFERENCE TO RELATED APPLICATIONS

This application is a U.S. National Stage Application under 35 U.S.C. 371 of International Patent Application No. PCT/EP2020/076193, filed Sep. 18, 2020, which is incorporated herein by reference in its entirety.

This application claims the benefit of European Patent Application No. 19306164.5, filed Sep. 23, 2019, which is incorporated herein by reference in its entirety.

TECHNICAL FIELD

The disclosure is in the field of video compression, and at least one embodiment relates more specifically to video prediction using external references.

BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding, the original image block is usually partitioned/split into sub-blocks using various partitioning such as quad-tree for example. To reconstruct the video, the compressed data is decoded by inverse processes corresponding to the prediction, transform, quantization and entropy coding.

SUMMARY

In at least one embodiment, it is proposed to perform video prediction based on reference elements that are generated according to a process that is not specified within the video coding system itself, thus outside of the scope of conventional codec specifications.

A first aspect is directed to a method for decoding video data comprising, for a current picture of the video: obtaining information representative of an external reference picture, and reconstructing the current picture based on the external reference picture.

A second aspect is directed to an apparatus for decoding video data comprising a decoder being configured to, for a current picture of the video: obtain information representative of an external reference picture, and reconstruct the current picture based on the external reference picture.

In variants of first and second aspect, the video is a multi-view video, the external reference picture comprises a texture of a first view and a motion vector map representing disparity information between the first view and a second view and reconstructing the second view is based on using motion compensation based on the texture of the first view and the disparity information. A further variant comprises copying the first view into a decoded picture buffer of the second view, associating the first view with a picture order count, copying the disparity information into the motion information map of a reference picture being co-located, and predicting the second view based on the copied information.

In a further variant, the prediction is done using a temporal motion vector prediction mode.

A third aspect is directed to a method for encoding video data comprising, for a current picture of the video: generating information representative of an external reference picture, and encoding the information representative of an external reference picture with the encoded video.

A fourth aspect is directed to an apparatus for encoding video comprising a decoder being configured to, for a current picture of the video: obtain information representative of an external reference picture, and reconstruct the current picture based on the external reference picture.

In variants of third and fourth aspect, the video is a multi-view video, the external reference picture comprises a texture of a first view and a motion vector map representing disparity information between the first view and a second view and reconstructing the second view is based on using motion compensation based on the texture of the first view and the disparity information.

A fifth aspect is directed to a video signal including a bitstream having video content and high-level syntax information, said bitstream being generated according to the third or fourth aspect.

One or more of the present embodiments also provide a non-transitory computer readable storage medium having stored thereon instructions for encoding or decoding video data according to at least part of any of the methods described above. One or more embodiments also provide a computer program product including instructions for performing at least part of any of the methods described above.

DETAILED DESCRIPTION

Various embodiments relate to a video coding system in which some elements required for decoding, and more particularly for prediction, are generated according to a process that is not specified within the video coding system. This process is hereafter referenced to as being the "external" process. This external process may generate "external" reference pictures to be used by a decoder that is adapted to use these external pictures. Encoding method, decoding method, encoding apparatus, decoding apparatus based on this post-processing method are proposed.

Moreover, the present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1:
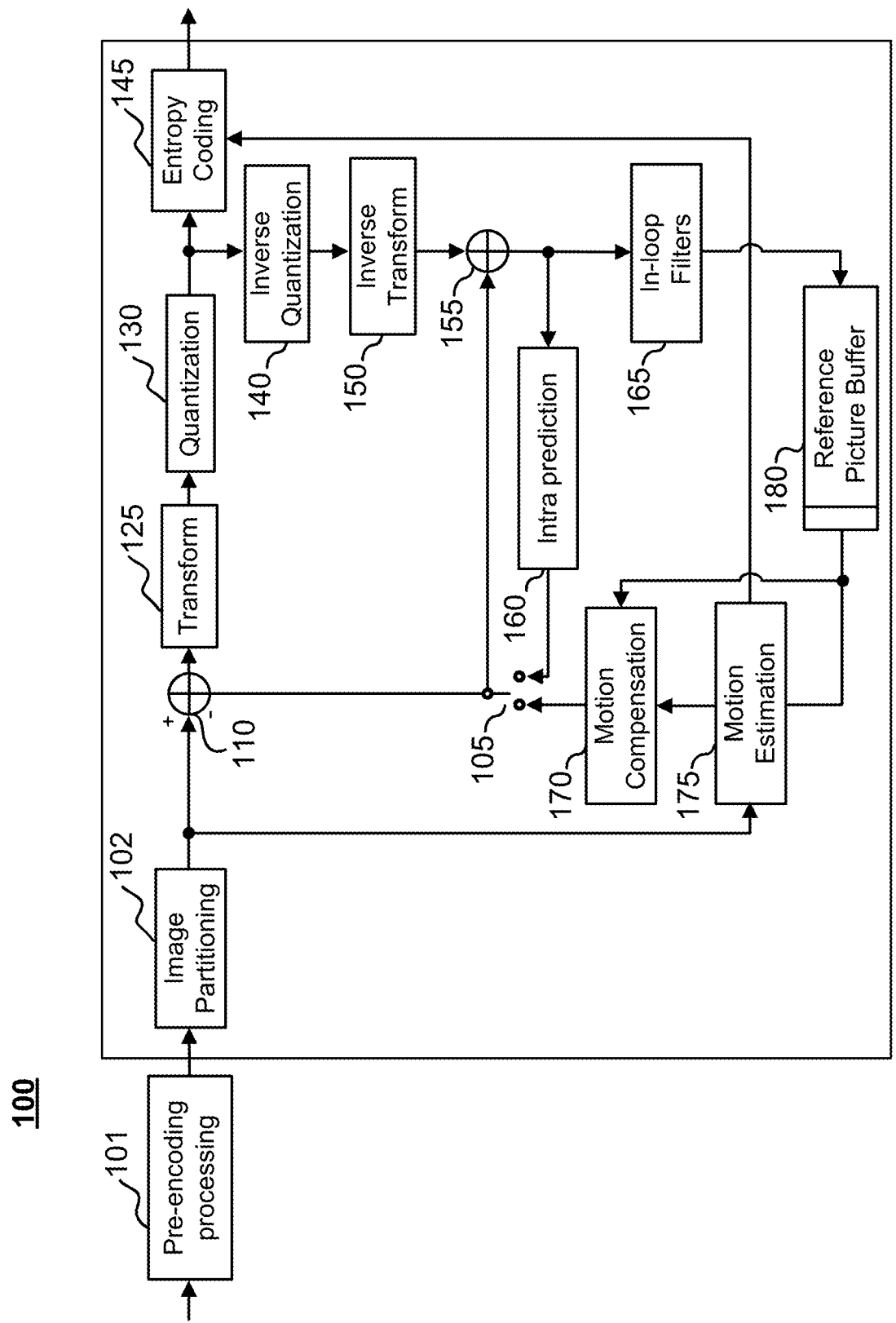
FIG. 1 illustrates a block diagram of a video encoder according to an embodiment.

FIG. 1 illustrates a video encoder 100. Variations of this encoder 100 are contemplated, but the encoder 100 is described below for purposes of clarity without describing all expected variations. Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset), Adaptive Loop-Filter (ALF) filtering to reduce encoding artifacts. The filtered image is stored at a reference picture buffer (180).

Figure 2:
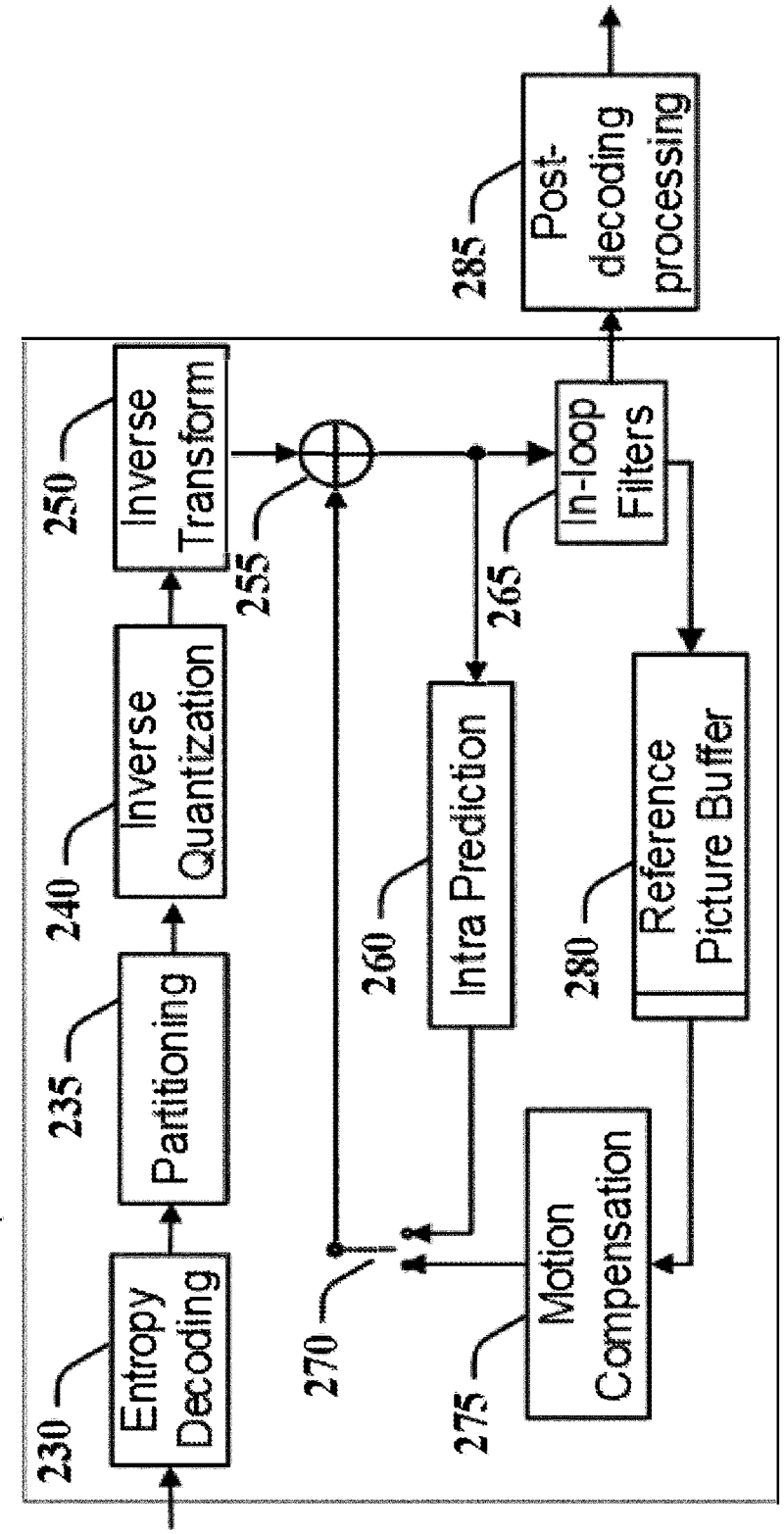
FIG. 2 illustrates a block diagram of a video decoder according to an embodiment.

FIG. 2 illustrates a block diagram of a video decoder 200. In the decoder 200, a bitstream is decoded by the decoder elements as described below. Video decoder 200 generally performs a decoding pass reciprocal to the encoding pass. The encoder 100 also generally performs video decoding as part of encoding video data. In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

Figure 3:
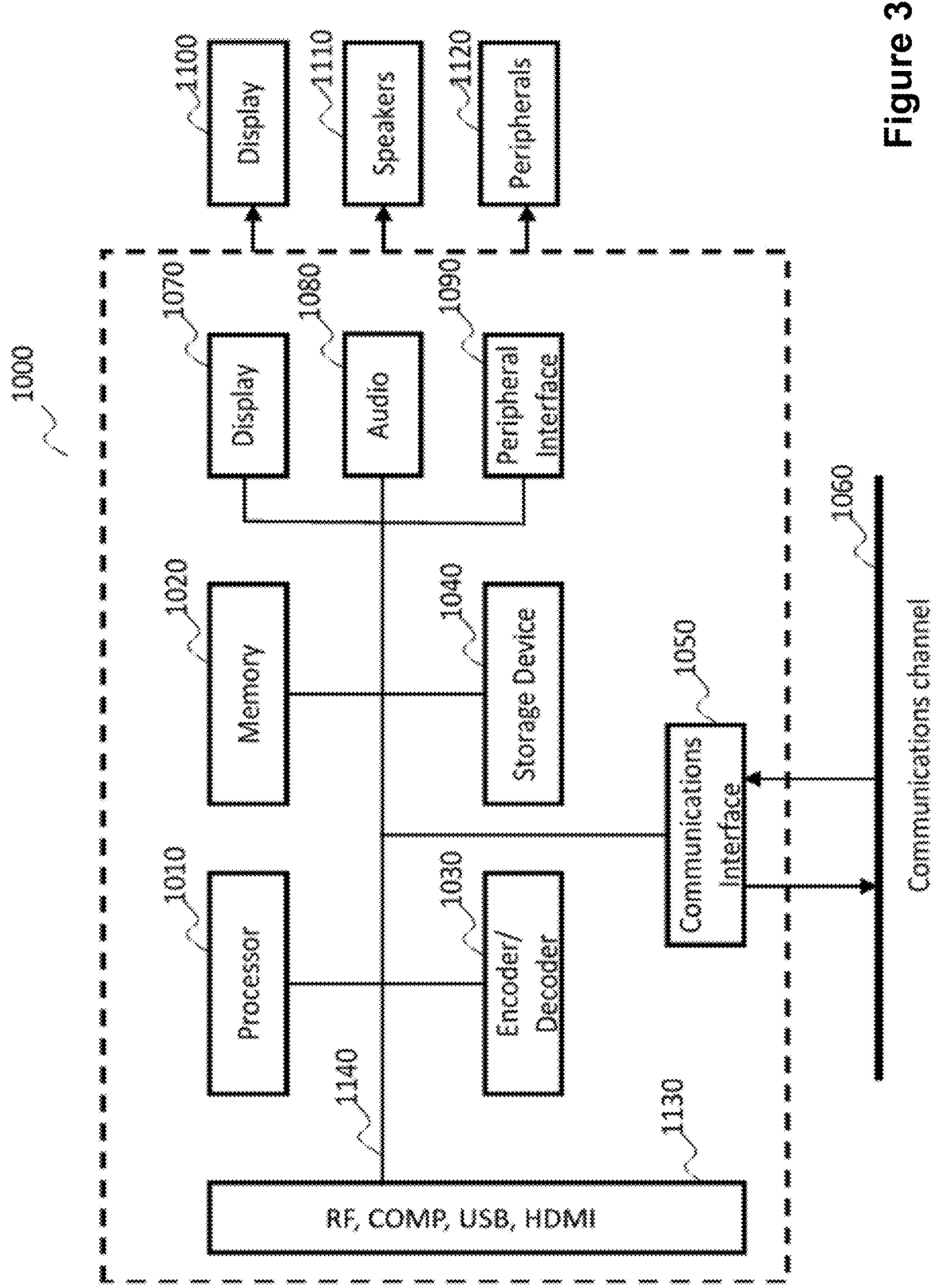
FIG. 3 illustrates a block diagram of an example of a system in which various aspects and embodiments are implemented.

FIG. 3 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The technical field of the invention is related to the reference picture buffer (180, 280) also known as decoded picture buffer, as well as the motion estimation (175) and motion compensation (170, 275) elements of a video encoder or decoder.

Figure 4:
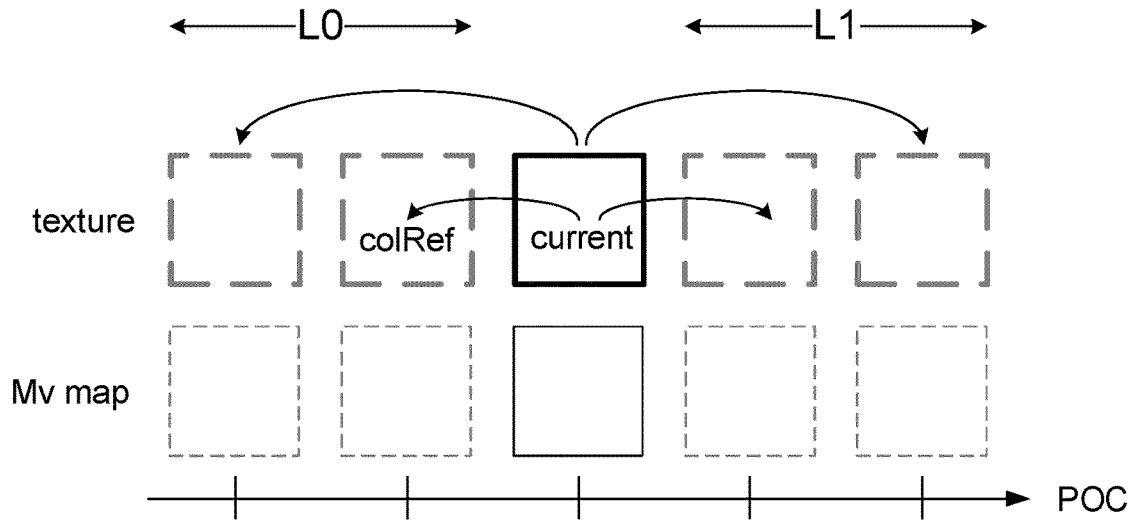
FIG. 4 illustrates the principle of the decoded picture buffer of a conventional block-based video coding standard.

FIG. 4 illustrates the principles of the decoded picture buffer of a conventional block-based video coding standard. In conventional block-based hybrid video coding standards such as VVC for example, a Decoded Picture Buffer (DPB) stores the different possible reference pictures that could be used for the decoding of the current picture. Pictures are displayed according to the Picture Order Count (POC) that provides a temporal reference to the pictures. The DPB may contain the reconstructed texture and the motion information map (MV-map a.k.a MV-info, a.k.a collocated motion) associated with each picture. The motion information contains the motion vectors, the reference indexes and the reference POC (pocRef) used to decode the blocks of the current picture typically. Generally, the motion information is stored at block-based resolution (e.g. 4×4 resolution).

During the decoding process of the current picture, the reconstructed motion information used to build the (current) block is stored in the MV-map to be possibly furtherly used for predicting MV of other blocks of the current picture or if the current picture is stored in the DPB (marked as "used for reference").

The reference picture list 0 (L0 shown at the left side of current picture) contains the list of reference pictures to be used for the decoding of P pictures. The reference picture list 0 and the reference picture list 1 (L1 shown at the right side of current picture) contain the list of reference pictures to be used for the decoding of B pictures.

Figure 5:
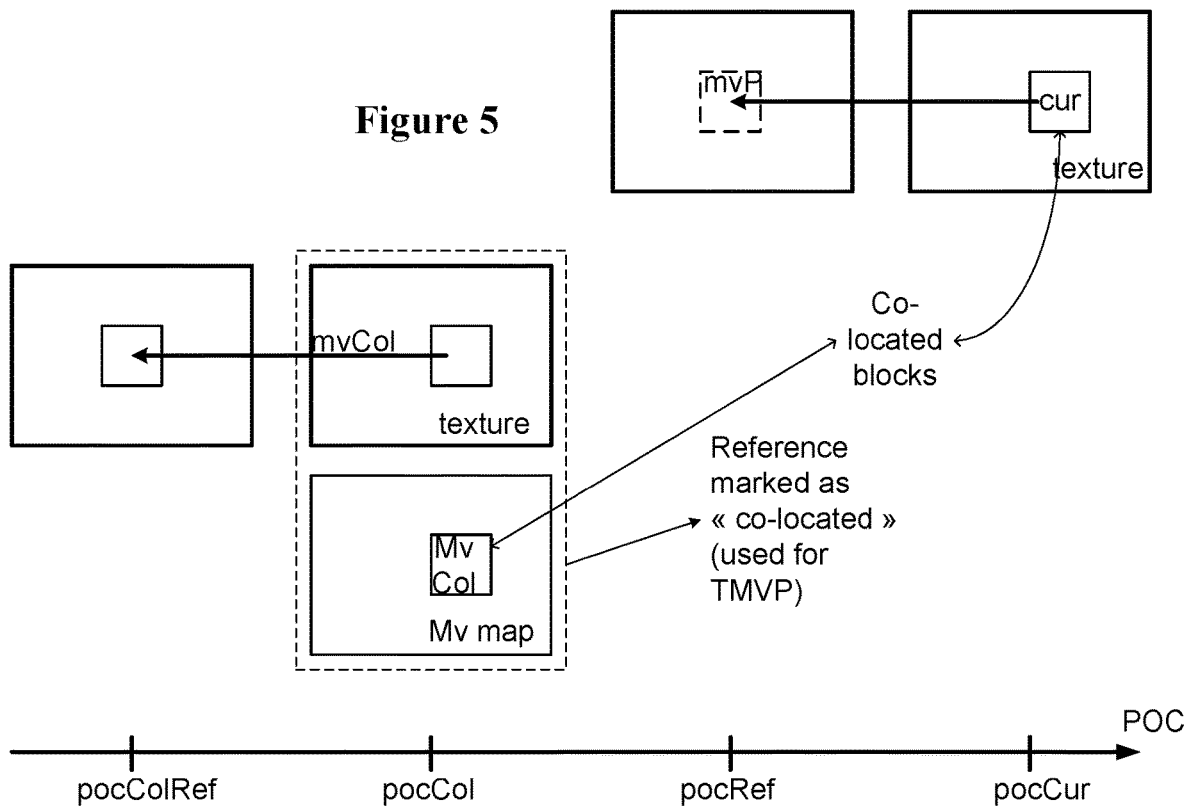
FIG. 5 illustrates the principles of a temporal motion vector prediction mode of a conventional block-based video coding standard.

FIG. 5 illustrates the principles of a temporal motion vector prediction mode of a conventional block-based video coding standard. Indeed, in conventional video codecs, the motion information can be used in a so-called Temporal Motion Vector Prediction mode (TMVP). In this mode, for each slice or picture, one reference of the DPB is signaled as co-located ("coLoc") illustrated by a dashed rectangle in the figure. Let's denote pocCol the POC of the "coLoc" reference picture. In the current picture, in the process of reconstructing a current block, the current block may use the co-located MV in the coLoc reference MV map to build the motion compensated prediction (eq.2). For example, the TMVP predictor is built from the co-located MV (mvCol) with a re-scaling process (eq.1). Let's denote pocRef the POC of the reference picture and pocColRef the reference picture associated with mvCol (FIG. 2) and used to reconstruct the co-located block in the "coLoc" picture:

$$TMVP = MV \times (pocCur - pocRef)/(pocCol - pocColRef) \quad (eq.1)$$

$$\text{pred-}Ima[pocCur][x] = Ima[pocRef][x + TMVP] \quad (eq.2)$$

$$\text{pred-}Ima[pocCol][x] = ima[pocColRef][x + mvCol] \quad (eq.3)$$

In the particular case where (pocCur−pocRef) is equal to (pocCol−pocColRef), then TMVP=MV, whatever the value of (pocCur−pocRef), thus avoiding an undefined result of equation 1 if pocCol is equal to pocColRef.

Figure 6:
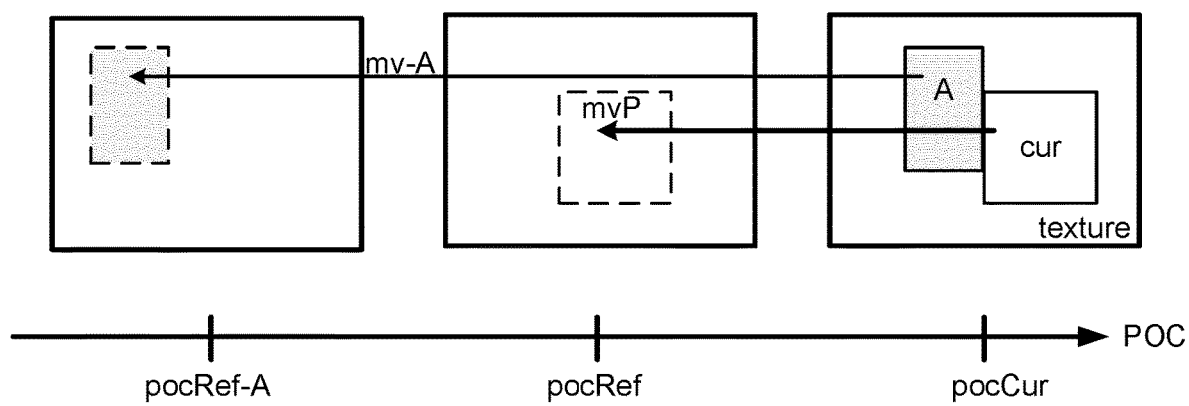
FIG. 6 illustrates the principles of an adaptive motion vector prediction mode of a conventional block-based video coding standard.

FIG. 6 illustrates the principles of an adaptive motion vector prediction mode of a conventional block-based video coding standard. Indeed, the motion information can also be used in a (another) so-called Adaptive Motion Vector Prediction mode (AMVP). In AMVP mode, a list of motion vector (MV) predictors are built from the reconstructed neighbors. Both the reference index (pocRef) and the index of the MV predictor in the list of MV predictors are signaled in the bitstream. In the figure, A represents the neighboring reconstructed candidate of current block, mvA the reconstructed MV of block A and refPocA the POC of the reference picture of the reference index of A. According to different video codecs, the motion vector predictor mvP can be equal to mvA or can be built from mvA with re-scaling (eq.4).

$$mvP = mvA \times (pocCur - pocRef)/(pocCur - pocRefA) \quad \text{(eq.4)}$$

Figure 7:
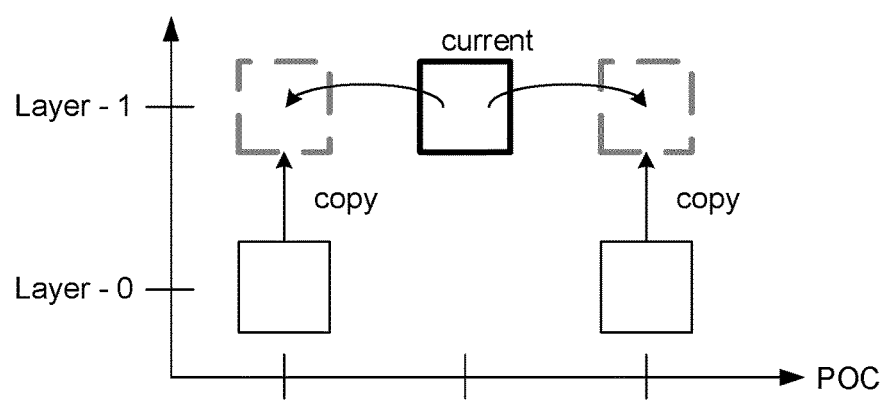
FIG. 7 illustrates the principles of temporal scalability of a conventional block-based video coding standard.

FIG. 7 illustrates the principles of scalability of a conventional block-based video coding standard. When a video codec uses scalability, the video encoder may generate several bitstreams (named layers) which allow encoding video sequences with enhanced quality or additional feature with regards to a base layer stream or another layer. For example, the reconstructed images may enhance resolution (spatial scalability), quality (SNR scalability), frame rate (temporal scalability), color gamut (color gamut scalability, high dynamic range scalability), bit-depth (bit-depth scalability), additional point-of-view (multi-view scalability), etc. The scalable video codecs leverage the capability to predict blocks with reconstructed images from another bitstream/layer it depends on. For example, the figure depicts temporal scalability where additional temporal pictures for layer 1 are coded possibly predicted with reconstructed reference frames from the base layer 0 stream (copied reference frames in the figure).

Figure 8:
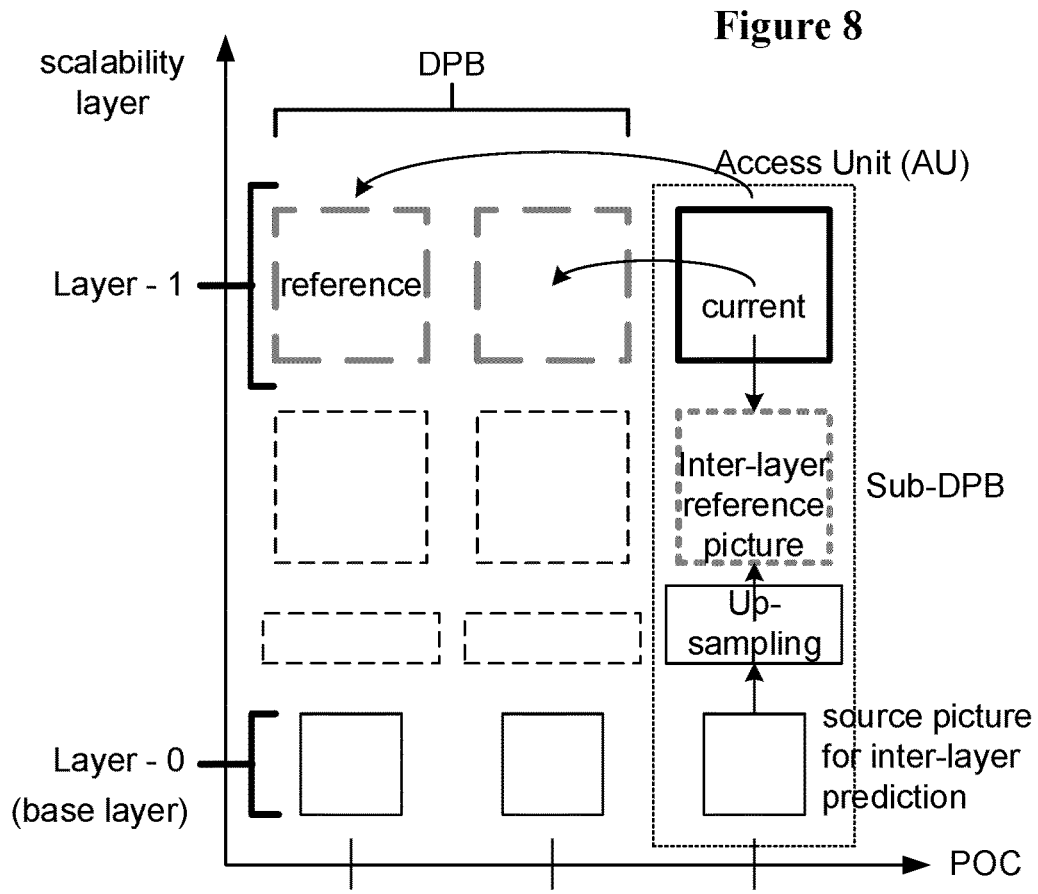
FIG. 8 illustrates an example of spatial scalability of a conventional block-based video coding standard.

FIG. 8 illustrates an example of spatial scalability of a conventional block-based video coding standard. In this example, the reconstructed pictures from the base layer (layer-0) may be re-scaled (e.g. up-sampled) and used as additional reference frame for building inter-prediction for the current layer (layer-1). Such additional reference frame is called inter-layer reference picture (ILRP) and is stored in a sub section of the decoded picture buffer (Sub-DPB). The inter-layer reference picture (ILRP) is temporally co-located with the current picture of the current layer, in other words they have same POC.

It is anticipated the need for future systems and/or applications, to be able to use reference textures and/or motion that are available through other (external) means, i.e. out of the scope of the current video standards. For example:

One picture of current layer may be predicted with a reconstructed picture decoded from another layer coded with different standard (for example: layer-1 is VVC encoded, layer-0 is AVC encoded).

It may be possible to use of one additional reference picture generated with application-based modules. For example, an additional "virtual reference" frame may be used that is computed with deep-learning based frame rate-up conversion algorithm based on two reference pictures of the DPB.

It may be possible to duplicate one reference picture with different weighted prediction parameters to manage local illumination compensation or for increasing motion precision. This principle could be extended with more elaborated illumination change models.

Multiview content may be used to provide parallax to immersive content. There are a lot of redundancies between the different views to allow this parallax. One view can be a good predictor of the next one when we compress them. There is no mechanism available in VVC to calculate a prediction of a view from texture and depth of another view. In order to exploit such promising possibility to predict one view from another one, there is a need to have a way to signal that one view in the DPB has been generated with external means to be used as a predictor.

Different video codecs support different mechanisms allowing scalability. SHVC proposes to use multi-layer coding and high-level syntax and defines an external layer as a base layer with nuh_layer_id equal to 0. However, only the decoding of pictures with nuh_layer_id greater than 0 may use an "external base layer". It is signaled with "vps_base_layer_internal_flag=0" in the video parameter set (VPS).

In traditional scalable codecs, the "inter-layer reference pictures" (ILRP) have same POC as current picture (same access unit). The ILRP are placed into the sub-DPB which contains the pictures of the DPB with same POC as current POC.

For example, in case of multi-view scalability, one may have two "inter-layer reference pictures" corresponding to two different views.

At this time, there is no foreseen extension of VVC to support scalability features with specific processes, nor specifically optimize the compression of multi-view plus depth content, contrary to what was done with HEVC (3D-HEVC and SHVC extensions/annexes). In VVC, it is envisaged to support scalability with high-level syntax signaling only.

The VVC draft specification describes the "reference picture list structure" for signaling the composition of the DPB to be used to decode current picture. The "reference picture list structure" syntax allows signaling information for building the list of the reference pictures POC. This syntax is show in table 1.

TABLE 1

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pics_flag[ listIdx ][ rplsIdx ][ i ] ) { | |
|       if( long_term_ref_pics_flag ) | |
|         st_ref_pic_flag[ listIdx ][ rplsIdx ][ i ]   short-term/long-term flag | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_slice_header_flag[ listIdx ][ rplsIdx ] ) | |
|         rpls_poc_lsb_lt[ listIdx ][ rplsIdx ][ j++ ] | u(v) |
|   } else | |

TABLE 1-continued

| | Descriptor |
|---|---|
|     ilrp_idc[ listIdx ][ rplsIdx ][ i ]<br>  }<br>} | ue(v) |

The process for building the reference pictures POC include the following steps:
as_delta_poc_st[listIdx][rplsIdx][i] specifies the value of the variable AbsDeltaPocSt[listIdx][rplsIdx][i] as follows:

```
if( sps_weighted_pred_flag | | sps_weighted_bipred_flag )
    AbsDeltaPocSt[ listIdx ][ rplsIdx ][ i ] = abs_delta_poc_st[ listIdx ][ rplsIdx ][ i ]    (7-121)
else
    AbsDeltaPocSt[ listIdx ][ rplsIdx ][ i ] = abs_delta_poc_st[ listIdx ][ rplsIdx ][ i ] + 1
```

Indeed, it is stated in the specification that the repeating reference pictures are not needed when weighted prediction is not enabled. In that way, zero delta POC values are disallowed when weighted prediction is not enabled.

In addition, the derivation of DeltaPocValSt from AbsDeltaPocSt is determined as follows:

```
for( i = 0; i < num_ref_entries[ listIdx ][ rplsIdx ]; i++ )
    if( !inter_layer_ref_pic_flag[ listIdx ][ rplsIdx ][ i ] && st_ref_pic_flag[ listIdx ][ rplsIdx ][ i ] )
                                                                                              (7-122)
        DeltaPocValSt[ listIdx ][ rplsIdx ][ i ] = ( strp_entry_sign_flag[ listIdx ][ rplsIdx ][ i ] ) ?
            AbsDeltaPocSt[ listIdx ][ rplsIdx ][ i ] : 0 − AbsDeltaPocSt[ listIdx ][ rplsIdx ][ i ]
``` and the derivation of reference picture lists from DeltaPocValSt is determined as follows:

```
for( i = 0; i < 2; i++ ) {
    for( j = 0, k = 0, pocBase = PicOrderCntVal; j < num_ref_entries[ i ][ RplsIdx[ i ] ]; j++) {
        if( !inter_layer_ref_pic_flag[ i ][ RplsIdx[ i ] ][ j ] ) {
            if( st_ref_pic_flag[ i ][ RplsIdx[ i ] ][ j ] ) { short-term reference picture
                RefPicPocList[ i ][ j ] = pocBase − DeltaPocValSt[ i ][ RplsIdx[ i ] ][ j ]
                if( there is a reference picture picA in the DPB with the same nuh_layer_id as the
current picture
                    and PicOrderCntVal equal to RefPicPocList[ i ][ j ] )
                    RefPicList[ i ][ j ] = picA
                else
                    RefPicList[ i ][ j ] = "no reference picture"
                (8-5)
                pocBase = RefPicPocList[ i ][ j ]
            } else {
                if( !delta_poc_msb_cycle_lt[ i ][ k ] ) {
                    if( there is a reference picA in the DPB with the same nuh_layer_id as the
current picture and
                        PicOrderCntVal & ( MaxPicOrderCntLsb − 1) equal to PocLsbLt[ i ][ k ] )
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id as the
current picture and
                        PicOrderCntVal equal to        FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
                k++
            }
        } else { inter-layer reference pictures
            layerIdx =
```

```
        DirectDependentLayerIdx[ GeneralLayerIdx[ nuh_layer_id ] ][ ilrp_idc[ i ][ RplsIdx ][ j ] ]
            refPicLayerId = vps_layer_id[ layerIdx ]
            if( there is a reference picture picA in the DPB with nuh_layer_id equal to refPicLayerId
and
                the same PicOrderCntVal as the current picture ) ILRP have same POC as
current POC
                RefPicList[ i ][ j ] = picA
            else
                RefPicList[ i ][ j ] = "no reference picture"
        }
    }
}
```

Embodiments described hereafter have been designed with the foregoing in mind. The encoder 100 of FIG. 1, decoder 200 of FIG. 2 and system 1000 of FIG. 3 are adapted to implement at least one of the embodiments described below and more particularly the motion estimation (175) and motion compensation (170, 275) elements of a video encoder or decoder using the reference picture buffer (180, 280).

In at least one embodiment, a video coding system uses external reference pictures to to reconstruct the video, these external reference pictures being generated locally by an external process beside the video coding/decoding process and not comprised in the encoded stream. In at least one embodiment, this principle is applied to multi-view and allows to predict a current view from another view using disparity equations.

In at least one embodiment, external reference pictures are signaled with the syntax elements describing the list of reference pictures used to reconstruct current picture (e.g. grouped with "reference picture list structure" in the example of VVC syntax). For that purpose, an "external_ref_pic_flag" is defined to signal that the reference picture is being provided by "external means not specified in the current specification".

The table 2 shows an example of corresponding high-level syntax. In all further syntax element described herein, the new elements are identified by underlined text.

TABLE 2

| if( enabled_external_ref_pic_flag ) | |
|---|---|
| external_ref_pic_flag[ listIdx ][ rplsIdx ][ i ] | u(1) |

In a variant embodiment, an additional flag "available_ref_pic_flag" is defined to signal that the reference picture is not available (neither present in the bitstream nor provided by external means) but the VPS includes information as if it were present in the bitstream.

In another variant, this flag is coded for inter-layer reference picture only, as shown in the high-level syntax example of Table 3.

TABLE 3

| ... | |
|---|---|
| } | |
| else { | |
|   ilrp_idc[ listIdx ][ rplsIdx ][ i ] | ue(v) |
|   if( enabled_external_ref_pic_flag ) | |
|     external_ref_pic_flag[ listIdx ][ rplsIdx ][ i ] | u(1) |
|   } | |
| } | |

In a variant embodiment, the presence of the flags "external_ref_pic_flag" and/or "available_ref_pic_flag" depends whether the reference picture is an ILRP or not, and/or depends whether the reference picture is short-term or long-term. For example, it is not present for long-term reference picture.

In at least one embodiment, the concept of "external reference picture" is extended to any layer. This means that:

the "external picture reference" may have nuh_layer_id not equal to 0 and/or that the decoding of pictures with nuh_layer_id equal to 0 may use an "external picture reference"

and/or that the "external picture reference" may be not considered as ILRP.

For example, in the example of VVC high-level-syntax this can be implemented by signaling whether the bitstream contains "external reference pictures" possibly added in the sub-DPB (enabled_external_ref_pic_flag). This flag may be coded in SPS, or VPS, DPS, PPS or slice header for example. Table 4 illustrates such flag in a SPS.

TABLE 4

| | Descriptor |
|---|---|
| seq_parameter_set_rbsp( ) { | |
| ... | |
| long_term_ref_pics_flag | u(1) |
| inter_layer_ref_pics_present_flag | u(1) |
| enabled_external_ref_pic_flag | |
| sps_idr_rpl_present_flag | u(1) |
| rpl1_same_as_rpl0_flag | u(1) |
| ... | |
| } | |

In a variant embodiment, the VPS includes for each layer a new flag named vps_external_layer[i] indicating whether the layer is external or not, as shown in table 5.

TABLE 5

| | Descriptor |
|---|---|
| video_parameter_set_rbsp( ) { | u(1) |
| ... | |
| for( i = 0; i <= vps_max_layers_minus1; i++ ) { | |
|   vps_layer_id[ i ] | u(6) |
|   vps_external_layer[ i ] | |
|   if( i > 0 && !vps_all_independent_layers_flag ) { | |
|     vps_independent_layer_flag[ i ] | u(1) |
|     if( !vps_independent_layer_flag[ i ] ) | |

TABLE 5-continued

| | Descriptor |
|---|---|
|     for( j = 0; j < i; j++ )<br>        vps_direct_dependency_flag[ i ][ j ]<br>   }<br> }<br>...<br>} | u(1) |

In at least one embodiment, external reference pictures have a different POC than the current POC (different access unit). In such case, i.e. when at least one external reference pictures has a POC that is different than the current POC, the MV rescaling process may apply.

In at least one embodiment, when the DPB contains several external reference pictures, two external reference pictures can be used for bi-prediction. This applies independently from the POC value of the external reference pictures. In a variant, the external reference pictures used for bi-prediction should have different POC than the current POC.

In at least one embodiment, several external reference pictures have the same POC than the current POC.

In at least one embodiment, several "external reference pictures" have the same POC (pocExt) that may be different from the current POC.

The following modification of VVC syntax identified by underlined text is required to make these embodiments possible.

abs_delta_poc_st[listIdx][rplsIdx][i] specifies the value of the variable AbsDeltaPocSt[listIdx][rplsIdx][i] as follows:

```
if( sps_weighted_pred_flag | | sps_weighted_bipred_flag | |
external_ref_pic_flag[ listIdx ][ rplsIdx ][ i ] )
    AbsDeltaPocSt[ listIdx ][ rplsIdx ][ i ] = abs_delta_poc_st[ listIdx ][ rplsIdx ][ i ]      (7-121)
else
    AbsDeltaPocSt[ listIdx ][ rplsIdx ][ i ] = abs_delta_poc_st[ listIdx ][ rplsIdx ][ i ] + 1
```

Regarding motion vectors, in SHVC, it is a requirement that the values of the reconstructed motion vectors are equal to zero when the reference is the IRLP. However, in case of multi-view prediction, since the reconstructed samples of the current view may not be spatially aligned with the reference view, this requirement is counterproductive. Therefore, in at least one embodiment, a flag (for example named zero_mv_ref_flag) indicates whether this requirement apply or not. The flag zero_mv_ref_flag may be coded in reference picture list structure or in VPS for example.

In a variant, another flag or the same flag indicates whether the MV-map should be set to zero or not. In a variant embodiment, this flag is coded for "external reference pictures" only. In a variant embodiment, this flag is coded in case of ILRP only, thus it is not present (and therefore inferred to false) in the case inter_layer_ref_pics_flag[listIdx][rplsIdx][i]=0. In a variant embodiment, to ensure same behaviour as in SHVC, this flag is not coded in case of ILRP and is inferred to true if inter_layer_ref_pics_flag[listIdx][rplsIdx][i]=1.

Figure 9:
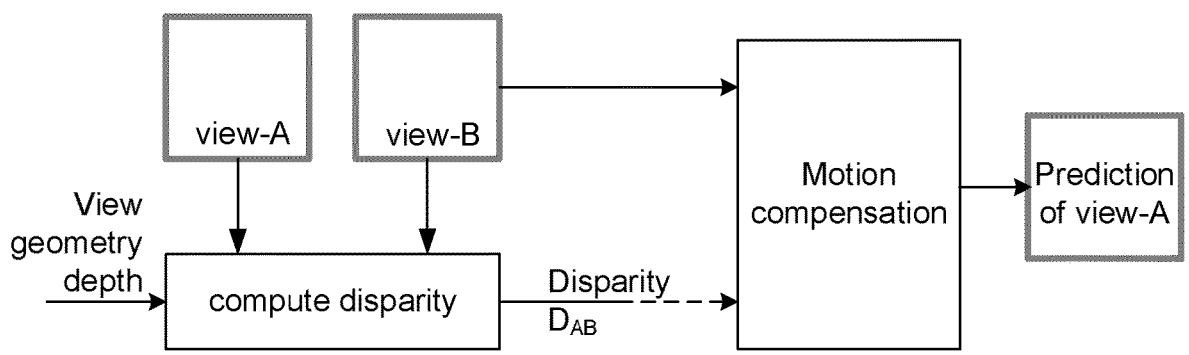
FIG. 9 illustrates an example embodiment where external reference pictures are used in a multi-view application.

FIG. 9 illustrates an example embodiment where external reference pictures are used in a multi-view application. Indeed, in case of multi-view system, if the viewport information of two views VA and VB (sensor position in the scene, field of view . . . ) and if the view depth is known (depth information for each sample of the texture view), then the disparity DAB in-between the two views VA and VB can be derived. The disparity information DAB allows projecting VB texture samples into VA (as shown in FIG. 9 and expressed by eq.6). In this case, the model is same as classical motion compensation applied on one reference picture (eq.4). Therefore, the VA texture can be predicted from the VB texture using the disparity as the motion information (MV), where VB texture is the reference picture (eq.5):

$$\text{pred-}Ima[pocCur][x] = Ima[pocRef][x+mv] \quad \text{(eq.5)}$$

$$\text{pred-view-}A[pocCur][x] = \text{view-}B[pocRef][x+DAB] \quad \text{(eq.6)}$$

Figure 10:
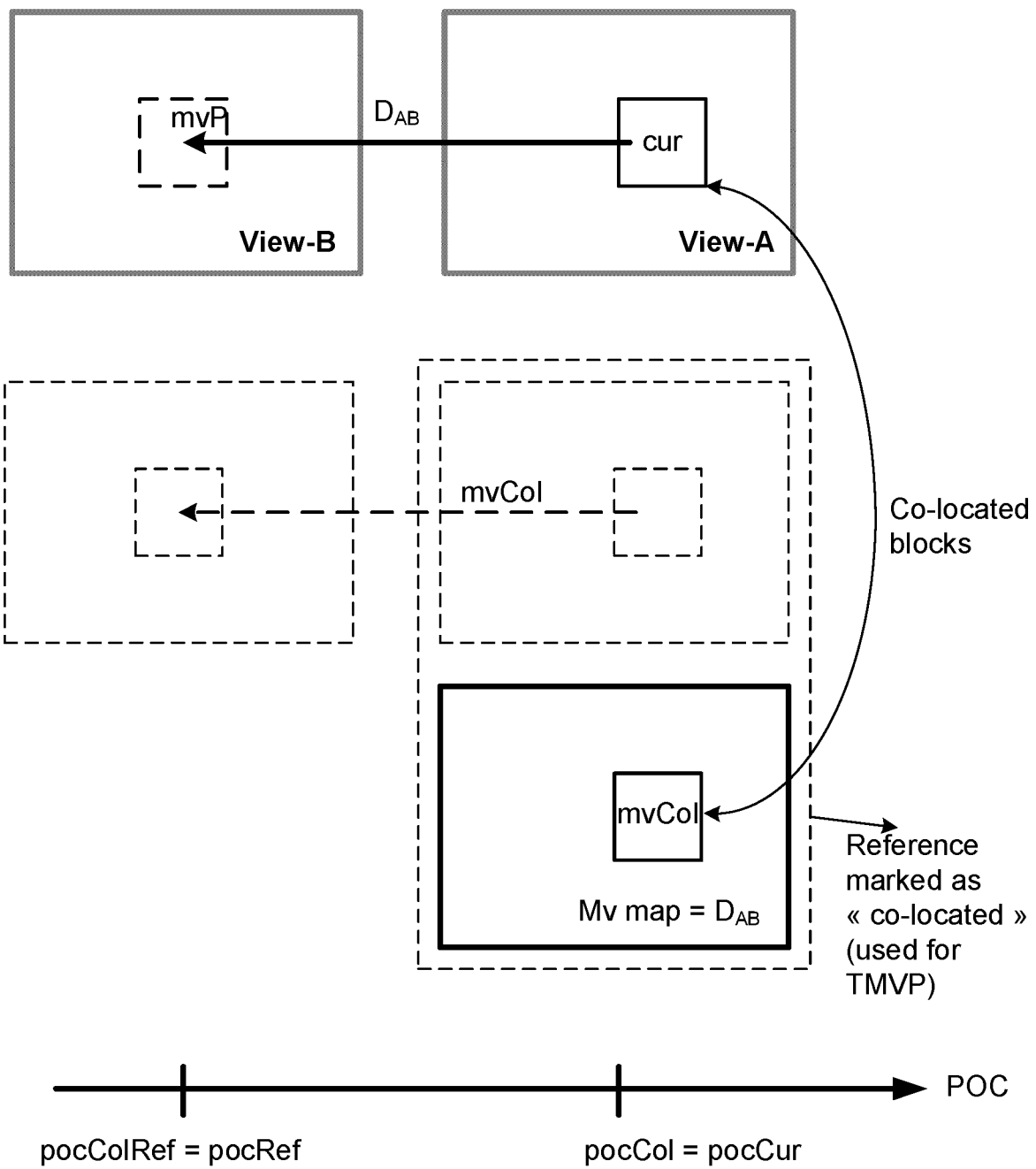
FIG. 10 illustrates an example embodiment of a multi-view application using the TMVP mode.

FIG. 10 illustrates an example embodiment of a multi-view application using the TMVP mode. At least one embodiment relates to a process for generating and signaling one "co-located" reference (texture and MV-info) so that it can be used via the TMVP mode to predict current view (view-A) from another view (view-B) using disparity equations.

For this purpose, the operation to be done are as follows:
- copy the view-B into the DPB of the view-A and associate "view-B" with pocRef,
- copy the disparity DAB into the motion information (MV-map) of the "co-located" reference picture (pocCol),
- then it is possible to predict the current block of view-A from the view-B using the disparity information as shown in FIG. 10 using the TMVP mode introduced earlier.

Figure 11:
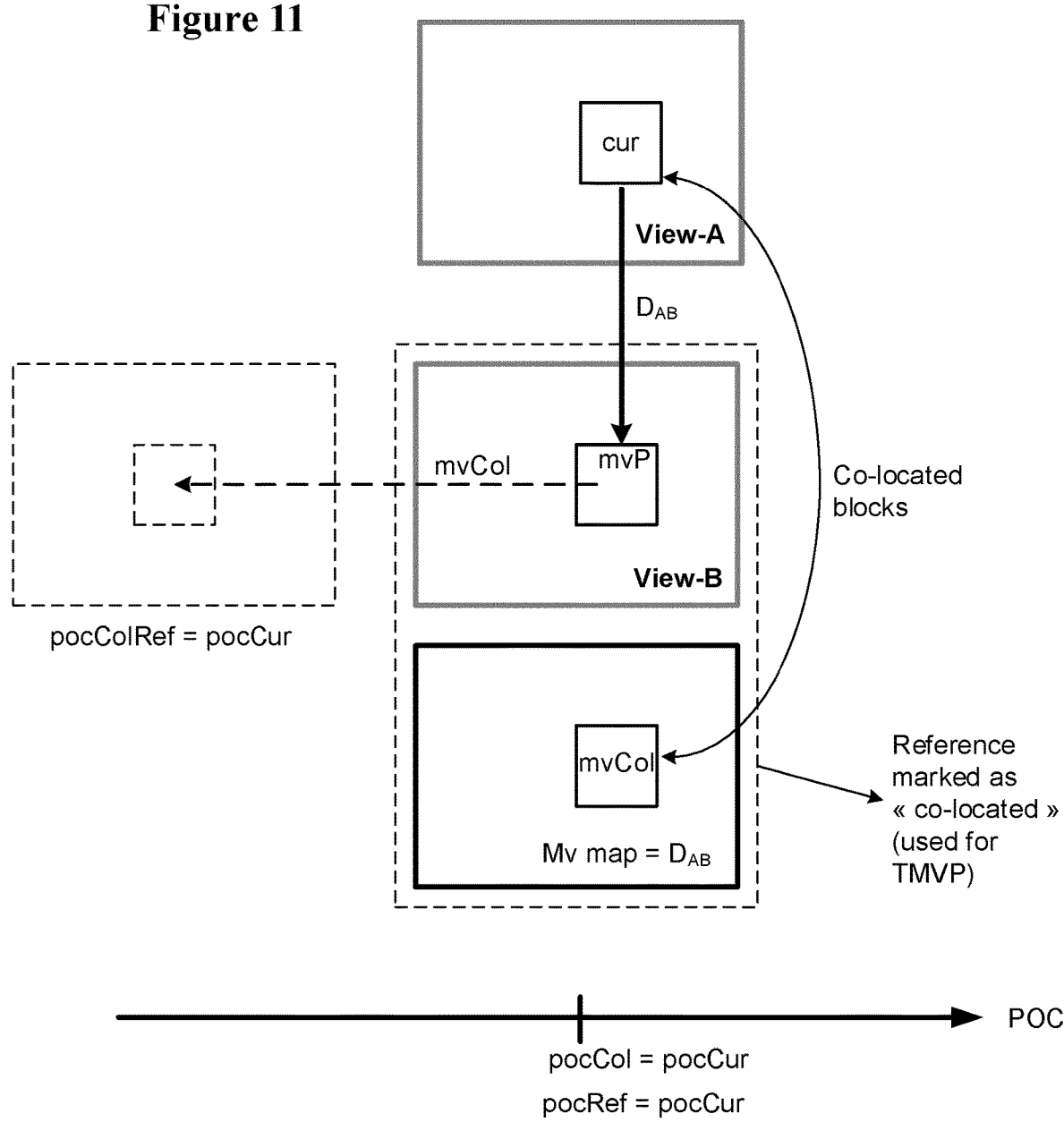
FIG. 11 illustrates a variant embodiment of a multi-view application using the TMVP mode.

FIG. 11 illustrates a variant embodiment of a multi-view application using the TMVP mode. In such embodiment, a reference picture is generated, marked as "co-located" and is composed of the texture of view-B and a MV-map built with disparity DAB (as shown in FIG. 9). The values for pocCol, pocRef and pocColRef are set equal to pocCur, thus (pocCur−pocRef) and (pocCol−pocColRef) being equal to zero, TMVP is equal to MVP as explained earlier.

In a variant embodiment, when using the syntax VVC-6.0, the MV-map of the ILRP is not copied into the sub-DPB but set to zero. It is signaled in the bitstream whether the MV-map of the ILRP is copied or not. The flag may be signaled in the SPS, slice header, DPS and/or VPS for example.

In a variant embodiment for the multi-view application, in case of AMVP with MV re-scaling, if the neighboring block A is predicted with AMVP then pocRefA is equal to pocCur, while pocRef may be different to pocCur. Consequently, the denominator of (eq.4) may be zero. To cope with this indetermination, the AMVP mode is amended as follows:

If AMVP uses MV re-scaling and pocCur is equal to pocRefA, then mvP is set equal to mvA.

In another variant embodiment, when AMVP uses MV re-scaling and pocCur is equal to pocRefA, then mvP is set equal to zero.

Figure 12:
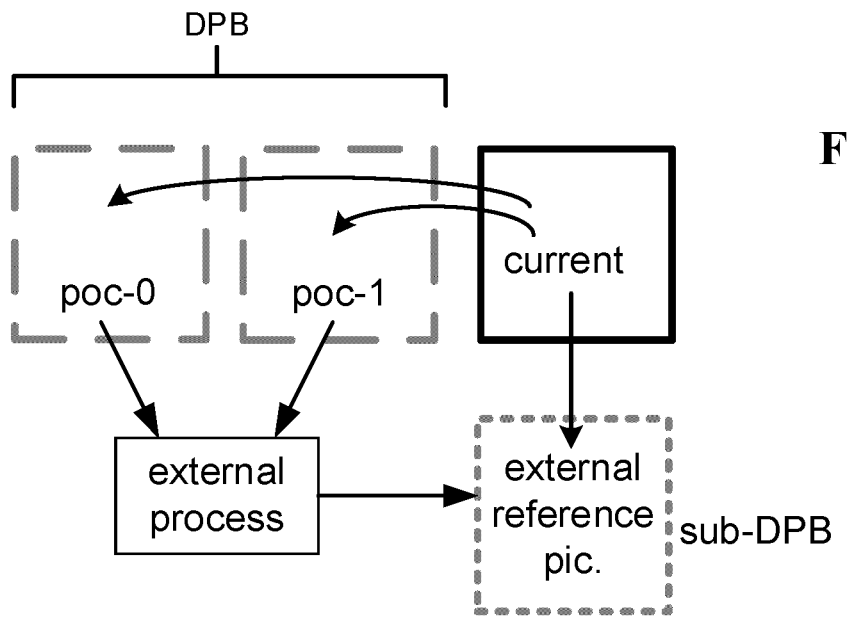
FIG. 12 illustrates a variant embodiment where the "external reference picture" is not ILRP.

FIG. 12 illustrates a variant embodiment where the "external reference picture" is not ILRP. In this embodiment, the dependency with reconstructed pictures of current layer ("use rec ref_pic_flag") is signaled. It indicates if the process for building the "external reference picture" needs some reconstructed pictures of current layer. If the "external reference picture" has same POC as current picture, it is placed in the sub-DPB. Two alternatives are possible: dependency with reference pics of current layer or dependency with non-reference pics of current layer.

Table 6 shows an example of corresponding syntax.

TABLE 6

| | |
|---|---|
| if( enabled_external_ref_pic_flag ) { | |
|    external_ref_pic_flag[ listIdx ][ rplsIdx ][ i ] | u(1) |
|    if ( external_ref_pic_flag[ listIdx ][ rplsIdx ][ i ] ) | |

TABLE 6-continued

| | |
|---|---|
|       use_rec_ref_pic_flag[ listIdx ][ rplsIdx ][ i ] | u(1) |
| } | |

Conventional scalable codecs specifications describe the processing for deriving the inter-layer reference picture (ILRP) from the source picture for inter-layer prediction. Typical examples are upscaling or color gamut scalability for which the algorithm are described in the specifications. However, some applications need applying different processes while keeping same inter-layer dependency information.

Figure 13:
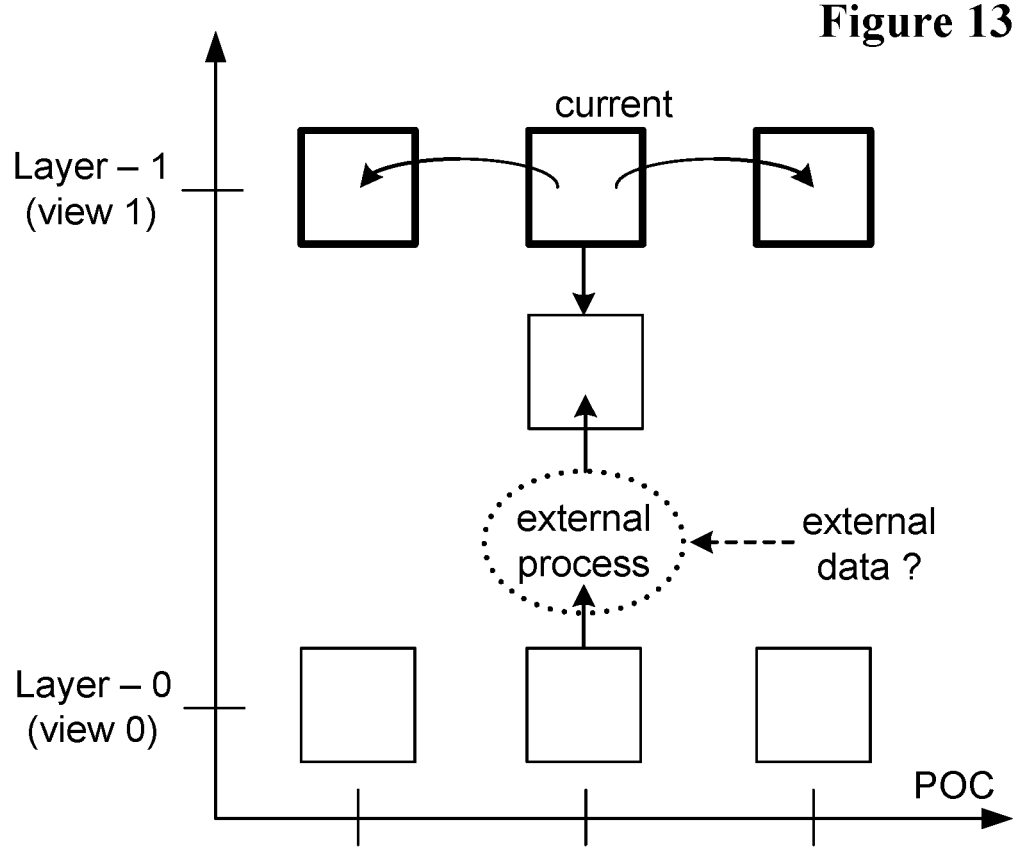
FIG. 13 illustrates an embodiment where the "external reference picture" is generated by an external process.

FIG. 13 illustrates an embodiment where the "external reference picture" is generated by an external process. In this case, external process refers to a process that is not defined in the video codec specification. External process may use current pictures but also may use external data to generate reference picture and motion vectors. In at least one embodiment, a flag for example named "vps_external_process_flag" is used to signal whether a reference picture uses an external process to build the inter-layer reference picture.

In a variant embodiment, in case vps_external_layer[i]=1, then the information vps_external_process_flag is not present. In another variant, if vps_external_process_flag is not present and vps_external_layer[i]=1, vps_external_process_flag is inferred to be equal to 1. In another variant, if vps_external_process_flag is not present and vps_external_layer[i]=0, vps_external_process_flag is inferred to be equal to 0.

Table 7 shows an example of syntax for reference picture list, as modified to implement at least one of the embodiments described above. Modified elements are identified by underlined text.

TABLE 7

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( enabled_external_ref_pic_flag ) { | |
|       external_ref_pic_flag[ listIdx ][ rplsIdx ][ i ] | u(1) |
|       if ( external_ref_pic_flag[ listIdx ][ rplsIdx ][ i ] | |
|         && !inter_layer_ref_pics_flag[ listIdx ][ rplsIdx ][ i ]) | |
|         use_rec_ref_pic_flag[ listIdx ][ rplsIdx ][ i ] | u(1) |
|     } | |
|     if ( external_ref_pic_flag[ listIdx ][ rplsIdx ][ i ] | |
|       || inter_layer_ref_pics_flag[ listIdx ][ rplsIdx ][ i ]) | |
|       zero_mv_ref_flag[ listIdx ][ rplsIdx ][ i ] | u(1) |
|     } | |
|     if( !inter_layer_ref_pics_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_slice_header_flag[ listIdx ][ rplsIdx ] ) | |
|         rpls_poc_lsb_lt[ listIdx ][ rplsIdx ][ j++ ] | u(v) |
|     } | |
|     else { | |
|       ilrp_idc[ listIdx ][ rplsIdx ][ i ] | ue(v) |
|       available_ref_pic_flag[ listIdx ][ rplsIdx ][ i ] | u(1) |
|     } | |
|   } | |
| } | |

Table 8 shows an example of syntax for reference picture list, as modified to implement at least one the embodiments described above. Modified elements are identified by underlined text.

TABLE 8

| | Descriptor |
|---|---|
| video_parameter_set_rbsp( ) { | |
|   vps_video_parameter_set_id | u(4) |
|   vps_max_layers_minus1 | u(6) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     vps_external_layer[ i ] | |
|     if( i > 0 && !vps_all_independent_layers_flag ) { | |
|       vps_independent_layer_flag[ i ] | u(1) |
|       if ( !vps_external_layer[ i ] ) | |
|         vps_external_process_flag[ i ] | u(1) |
|       if( !vps_independent_layer_flag[ i ] ) | |
|         for( j = 0; j < i; j++ ) { | |
|           vps_direct_dependency_flag[ i ][ j ] | u(1) |
|         } | |

TABLE 8-continued

| | Descriptor |
|---|---|
| } | |
| } | |
| if( vps_max_layers_minus1 > 0 ) { | |
|   vps_output_layers_mode | u(2) |
|   if( vps_output_layers_mode = = 2 ) | |
|     for( i = 0; i < vps_max_layers_minus1; i++ ) | |
|       vps_output_layer_flag[ i ] | u(1) |
| } | |
| vps_constraint_info_present_flag | u(1) |
| vps_reserved_zero_7bits | u(7) |
| if( vps_constraint_info_present_flag ) | |
|   general_constraint_info( ) | |
| vps_extension_flag | u(1) |
| if( vps_extension_flag ) | |
|   while( more_rbsp_data( ) ) | |
|     vps_extension_data_flag | u(1) |
| rbsp_trailing_bits( ) | |
| } | |

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1, 2 and 3 provide some embodiments, but other embodiments are contemplated and the discussion of these figures does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the reference picture buffer (180, 280), the motion compensation and motion estimation modules (170, 175, 275), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, tablets, smartphones, cell phones, portable/personal digital assistants, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

In the present application, the terms "reconstructed" and "decoded" may be used interchangeably, the terms "pixel" and "sample" may be used interchangeably, the terms "image," "picture", "frame", "slice" and "tiles" may be used interchangeably. Usually, but not necessarily, the term "reconstructed" is used at the encoder side while "decoded" is used at the decoder side.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of an illumination compensation parameter. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. An apparatus comprising:
at least one processor configured to:
perform a first process for decoding an encoded stream comprising data representing a video, the first process comprising, for a current picture of the video: obtaining, from the encoded stream, information representative of a use of an external reference picture for reconstructing the current picture;
obtaining, from the encoded stream, information representative of an index in a set of reference pictures of an external reference picture to be used for reconstructing the current picture; and
reconstructing the current picture based on the external reference picture obtained from the set of reference pictures based on the obtained index, wherein the external reference picture is generated locally and not comprised in the encoded stream; and
perform a second process to generate at least one external reference picture.

2. The apparatus of claim 1, wherein the video is a multi-view video, wherein the external reference picture comprises a texture of a first view and a motion vector map representing disparity information between the first view and a second view and wherein the at least one processor is further configured to reconstruct the second view based on using motion compensation based on the texture of the first view and the disparity information.

3. The apparatus of claim 2, wherein the at least one processor is further configured to:
copy the first view into a decoded picture buffer of the second view;
associate the first view with a picture order count;
copy the disparity information into the motion information map of a reference picture being co-located; and
predict the second view based on the copied information.

4. The apparatus of claim 3, wherein the at least one processor is further configured to predict the second view using a temporal motion vector prediction mode.

5. A method for decoding an encoded stream comprising data representing a video, the method comprising, for a current picture of the video:
obtaining, from the encoded stream, information representative of a use of an external reference picture for reconstructing the current picture;
obtaining, from the encoded stream, information representative of an index in a set of reference pictures of an external reference picture to be used for reconstructing the current picture; and
reconstructing the current picture based on the external reference picture obtained from the set of reference pictures based on the obtained index, wherein the external reference picture is generated locally and not comprised in the encoded stream.

6. The method of claim 5, wherein the video is a multi-view video, wherein the external reference picture comprises a texture of a first view and a motion vector map representing disparity information between the first view and a second view and wherein reconstructing the second view is based on using motion compensation based on the texture of the first view and the disparity information.

7. The method of claim 6, further comprising:
copying the first view into a decoded picture buffer of the second view;
associating the first view with a picture order count;
copying the disparity information into the motion information map of a reference picture being co-located; and
predicting the second view based on the copied information.

8. The method of claim 7, wherein the predicting the second view uses a temporal motion vector prediction mode.

9. A non-transitory computer readable medium comprising program code instructions that, when executed by at least one processor, cause the least one processor to:
perform a first process for decoding an encoded stream comprising data representing a video, the instructions causing the at least one processor to, for a current picture of the video:
obtain, from the encoded stream, information representative of a use of an external reference picture for reconstructing the current picture;
obtain, from the encoded stream, information representative of an index in a set of reference pictures of an external reference picture to be used for reconstructing the current picture; and
reconstruct the current picture based on the external reference picture obtained from the set of reference pictures based on the obtained index, wherein the external reference picture is generated locally and not comprised in the encoded stream; and
perform a second process to generate at least one external reference picture.

10. The non-transitory computer readable medium of claim 9, wherein the video is a multi-view video, wherein the external reference picture comprises a texture of a first view and a motion vector map representing disparity information between the first view and a second view, and wherein reconstructing the second view is based on using motion compensation based on the texture of the first view and the disparity information.

11. The non-transitory computer readable medium of claim 10, wherein the program code instructions further cause the at least one processor to decode data representing the video by:
copying the first view into a decoded picture buffer of the second view;
associating the first view with a picture order count;
copying the disparity information into the motion information map of a reference picture being co-located; and
predicting the second view based on the copied information.

12. The non-transitory computer readable medium of claim 11, wherein the predicting the second view uses a temporal motion vector prediction mode.

* * * * *